United States Patent [19]

Kurashige et al.

[11] 4,412,864

[45] Nov. 1, 1983

[54] ASPHALT COMPOSITIONS AND A VIBRATION-DAMPING SHEET FORMED BY THE SAME

[75] Inventors: Tomozo Kurashige; Hidetoshi Shimada, both of Sodegaura, Japan

[73] Assignee: Idemitsu Kosan Co., Ltd., Tokyo, Japan

[21] Appl. No.: 253,044

[22] Filed: Apr. 10, 1981

[51] Int. Cl.³ .............................................. C08L 93/00
[52] U.S. Cl. ................... 106/235; 106/281 R; 524/59; 524/76; 106/281 N
[58] Field of Search ............... 106/232, 281, 235, 234; 524/62, 69, 59

[56] References Cited

U.S. PATENT DOCUMENTS 4,207,231 6/1980 Goodrich ............................ 106/232
4,248,749 2/1981 Hayashi et al. ..................... 106/264
4,287,263 9/1981 Woodring et al. .................. 106/281

*Primary Examiner*—Theodore Morris
*Attorney, Agent, or Firm*—Frishauf, Holtz, Goodman & Woodward

[57] ABSTRACT

An asphalt composition comprising (A) 100 parts by weight of straight asphalt; (B) 0.1 to 20 parts by weight of a diene liquid rubber having at least one carboxyl group, epoxy group or amino group in the molecule; and (C) 2 to 350 parts by weight of (i) a fibrous filler or (ii) at least one filler selected from the group consisting of wood flour, talc, calcium carbonate, clay, carbon black and white carbon, having a grain size of 200 microns or less. The composition may also contain (D) 1 to 50 parts by weight of a resinous tackifier. The invention also provides a vibration damping sheet comprising said composition.

17 Claims, No Drawings

ASPHALT COMPOSITIONS AND A VIBRATION-DAMPING SHEET FORMED BY THE SAME

BACKGROUND OF THE INVENTION

The present invention relates to an asphalt composition. The present invention also relates to a vibration-damping sheet formed by the asphalt composition. It relates more particularly to an asphalt composition comprising a straight asphalt, a specific liquid rubber, a filler and, if necessary, a resinous tackifier, which has excellent physical properties, particularly heat-resistance, cold-resistance and anti-corrosion characteristics.

Heretofore, elastomers have been incorporated into straight asphalt for the modification thereof. These elastomers, however, generally have high viscosities and poor miscibility with asphalt. It is difficult to uniformly disperse such elastomers into asphalt. In the conventional method, liquid rubber having hydroxy groups at the molecule terminals is reacted with straight asphalt by the use of a cross-linking agent, such as diisocyanate. This method, however, has disadvantages in that diisocyanate has high toxicity and poor stability, and thus inconveniences are involved in handling.

In order to prevent vibration of floors of cars and of other substrates, it is effective to heat-bond a vibration-damping sheet formed by molding an asphalt composition, on such substrates. Conventional vibration-damping sheets, however, suffer from the disadvantages of the narrow temperature range in which a satisfactory vibration-preventing effect can be maintained and of their poor quality particularly with regard to reproducibility.

SUMMARY OF THE INVENTION

It has now been discovered that straight asphalt can be sufficiently modified by incorporating thereinto a specific liquid rubber, a filler and, optionally, a resinous tackifier, without the use of a cross-linking agent.

An object of the present invention is to provide an asphalt composition having excellent physical properties, such as heat-resistance, cold-resistance, tackiness, adhesion, weather-resistance, and anti-corrosion.

Another object of the present invention is to provide an asphalt composition which is suitable for use in the production of an asphalt vibration-damping sheet having improved properties.

A further object of the present invention is to provide a vibration-damping sheet formed by said asphalt composition.

The present invention, therefore, provides an asphalt composition comprising, (A) 100 parts by weight of an asphalt, preferably a straight asphalt;

(B) 0.1 to 20 parts by weight of a diene-base liquid rubber containing a carboxyl group, an epoxy group, or an amino group;

(C) 2 to 350 parts by weight of a fibrous filler, or at least one filler having a grain size of 200 microns or less and selected from the group consisting of wood flour, talc, calcium carbonate, clay, carbon black and white carbon.

The invention also provides a composition comprising:

(A), (B), (C) as described above, and (D) 1 to 50 parts by weight of a resinous tackifier.

The present invention also provides a vibration-damping sheet formed by said composition.

DETAILED DESCRIPTION OF THE INVENTION

Component (A) of the present asphalt composition, straight asphalt, is obtained by recovering bitumen present in crude oil by vacuum-distillation or steam-distillation or by a combination thereof. The straight asphalt as used herein usually has a penetration of 10 to 200 and preferably a penetration of 40 to 100.

Although the present invention is intended to improve the physical properties of straight asphalt, the physical properties of blown asphalt can also be improved by the addition of Components (B), (C) and, if necessary, (D). Since straight asphalt generally has inferior physical properties to blown asphalt, the foregoing objects of the present invention can be attained by using blown asphalt in place of straight asphalt. Thus, the use of such blown asphalt is included within the scope of the present invention.

The straight asphalt as used herein may contain about 50% by weight or less of other asphalt components, such as natural asphalt, asphaltite, semi-blown asphalt, and blown asphalt.

Component (B) of the present asphalt composition, liquid rubber, is composed mainly of diene monomers. It has a number average molecular weight of 500 to 8,000, and has a viscosity of 2,000 poises or less, preferably 500 poises or less at 30° C., thereby exhibiting fluidity at room temperature. It is essential that the liquid rubber have functional groups, such as a carboxyl group, an epoxy group, or an amino group, at the terminals of the molecule, or in the molecule.

Liquid rubber having functional groups in the molecule is known in the art. A liquid rubber having a carboxyl group in the molecule is prepared by reacting a liquid rubber having a hydroxyl group in the molecule with maleic anhydride. A liquid rubber having an epoxy group in the molecule is prepared by reacting a liquid rubber having a hydroxyl group in the molecule with a peracetic acid.

Those liquid rubbers having a hydroxy group, a cyano group, a mercapto group, a halogen atom, or an aziridino group are somewhat inferior in their heat-stabilization properties when compared to the foregoing liquid rubbers.

Example of such liquid rubbers which can be used in the present invention include polybutadiene liquid rubbers, such as butadiene homopolymers, e.g., 1,2-polybutadiene and 1,4-polybutadiene, and butadiene copolymers, e.g., a styrene-butadiene copolymer, an acrylonitrilebutadiene copolymer, a butadiene-isoprene copolymer, and a butadiene-pentadiene copolymer, which all contain therein the foregoing functional groups, i.e., a carboxyl group, an epoxy group, or an amino group. In addition, polyisoprene, polychloroprene, etc. containing therein the foregoing function groups can be used.

The liquid rubber as used herein acts to increase the heat-stability of the resulting asphalt composition. The amount of the liquid rubber added is from 0.1 to 20 parts by weight, preferably from 0.5 to 10 parts by weight, per 100 parts by weight of the asphalt, Component (A) of the present asphalt composition. When the amount of the liquid rubber is less than 0.1 parts by weight, the heat-stabilization effect is small, and when the amount thereof is greater than 20 parts by weight, the softening point of the asphalt composition is undesirably lowered.

Component (C) of the present asphalt composition, the filler, reacts chemically with the functional group of the liquid rubber to some extent to form a weak bond, thereby curing the liquid rubber, increasing the softening point of the asphalt composition, and improving the heat-stability of the asphalt composition.

The filler used in this invention includes a fibrous filler, such as asbestos, and/or at least one filler selected from the group consisting of wood flour, talc, calcium carbonate, clay, carbon black, and white carbon which have a grain size of 200 microns or less. Of these fillers, wood flour, talc, and calcium carbonate are particularly preferred. Examples of such fibrous fillers include asbestos, insoluble anhydrous gypsum crystal fiber or its modified product, and a fiber opening-processed product of waste paper or its modified product. Of these fibrous fillers, asbestos is particularly preferred.

It is to be noted that the physical properties of such an asphalt composition cannot be improved by adding sand, gravel, etc. thereto.

The grain size of the filler is generally preferred to be as small as possible although it varies depending on the type of the filler. It is usually 200 microns or less, referably 150 microns or less, and more preferably 100 microns or less. When the filler has a grain size of more than 200 microns, its reactivity is lowered because of its reduced specific surface area, and thus it cannot sufficiently contribute to the improvement in the physical properties of the composition. In greater detail, it is preferred that wood flour has a grain size of 150 microns or less (passing through 100 mesh screen), talc has a grain size of 50 microns or less, and calcium carbonate has a grain size of 2 microns or less.

Fibrous fillers such as asbestos and a fiber opening-processed product of waste paper can be used irrespective of their length, because they have large specific surface areas.

The amount of the filler added is from 2 to 350 parts by weight, preferably from 5 to 200 parts by weight, per 100 parts by weight of the asphalt, Component (A) of the asphalt composition.

When the amount of the filler added is less than 2 parts by weight, an increase in the softening point of the asphalt composition is small, and when it is more than 350 parts by weight, a uniform dispersion of the filler in the composition cannot be attained.

When molding the vibration-damping sheet from the present asphalt composition, the filler acts in combination with the liquid rubber, thereby increasing the softening point of the vibration-damping sheet and controlling the heat fluidity of the sheet to an appropriate range. This improvement in the heat fluidity permits bringing the sheet into close contact with an uneven substrate without changing the uniform thickness thereof. The composite action of the liquid rubber and the filler, i.e., Components (B) and (C) of the present asphalt composition, can be obtained more effectively by mixing them in advance than by mixing them directly with the other components.

The asphalt composition of the present invention comprising Components (A), (B) and (C) as described hereinbefore has a greatly increased softening point, markedly improved heat stability, without a lowering of the rust-prevention ability of the straight asphalt. At the same time, the asphalt composition of the present invention has improved cold-resistance, stickness, adhesion, weather resistance, etc., as compared with conventional straight asphalt compositions. Furthermore, the asphalt composition of the present invention has the advantage that since the Components (A), (B), and (C) are not toxic and have high stability, they can be mixed or handled with ease in the production of the asphalt composition.

In another embodiment of the present invention, the asphalt composition of the present invention comprises (A), (B) and (C) as described hereinbefore and 1 to 50 parts by weight of Component (D), resinous tackifier.

Examples of such resinous tackifiers which can be used include a natural resin, such as rosin and dammer; a modified rosin, such as polymerized rosin and partially hydrolyzed rosin; derivatives of rosin or modified rosin, such as glycerol ester rosin and pentaerythritol ester rosin; a polyterpene resin, such as a β-pinene polymer; a modified terpene product, such as terpene phenol; an aliphatic hydrocarbon resin, such as an olefinic polymer, and its modified product; a cyclopentadiene resin; an aromatic petroleum resin; a phenol resin and an alkylphenol-acetylene resin; a styrene resin; a xylene resin; a cumarone-indene resin; and a vinyl toluene-α-methyl-styrene copolymer. These tackifiers can be used alone or in combination with each other.

Of these tackifiers, those having a softening point of about from 70° to about 150° C. are preferably used. In particular, it is preferred to use petroleum resins or to use such petroleum resins in combination with other resins.

The amount of the resinous tackifier added is within the range of from 1 to 50 parts by weight per 100 parts by weight of the straight asphalt. When the amount of the resinous tackifier added is less than 1 part by weight, the stiffness required for the vibration-damping sheet, which is to be molded from the asphalt composition of the present invention, is insufficient, and when the amount is greater than 50 parts by weight, the elasticity of the vibration-damping sheet is adversely affected and thus its vibration-preventing properties are deteriorated.

The asphalt vibration-damping sheet can be obtained by molding the asphalt composition of the present invention in a sheet-like form. In particular, a preferred sheet can be obtained from an asphalt composition having the following formulation:

(A) 100 parts by weight of straight asphalt;

(B) about 1 to about 50 parts by weight of the resinous tackifier; and a mixture of (B) about 0.1 to about 10 parts by weight of the diene-based liquid rubber; and (c) about 100 to about 300 parts by weight of the filler.

In accordance with the foregoing formulation, the diene-base liquid rubber (Component (B)) and the filler (Component (C)) act in combination with each other, and the resulting composite action increases the softening point of the vibration-damping sheet to a suitable level and controls the heat fluidity (attachment to substrates) of the sheet within the range that is suitable for use as a vibration-damping material. It is preferred to bring Component (B) in direct contact with Component (C) or to mix Components (B) and (C) in such a manner that they frequently come in contact with each other. For example, in accordance with one embodiment, Components (A) and (B) are not brought in contact with each other in advance, and Components (A), (B), (C) and (D) are separately heated to about 100° to 200° C. and then mixed at the same time. It is more preferred to prepare a mixture of Components (B) and (C); Component (A) and Component (D) are mixed in any desired order or mixed at the same time. It is preferred to admix a mixture of Components (B) and (C) and a mixture of Components (A) and (D). In particular, those embodiments wherein a mixture of Components (B) and (C) is utilized are preferred.

In mixing these components, it is preferred that Component (A) or a mixture of Components (A) and (D) is heated to the range of about from 100° to 200° C. as described above. When the temperature of Component (A) or the mixture of Components (A) and (D) is lower than 100° C., undesired difficulties are involved, often leading to insufficient mixing. On the other hand, when the temperature is higher than 200° C., there may be deterioration in the quality of Component (B).

The production of an asphalt vibration-damping sheet from the asphalt composition of the present invention will be explained in detail.

Component (A) (straight asphalt) is placed in a pot and heated to about from 160° to 170° C., and Component (D) (tackifier) was added thereto. The resulting mixture is further heated with stirring to form a molten mixture of Components (A) and (D). The thus-obtained molten mixture is introduced into, for example, a heat-insulation type kneader. An example of such heat-insulation type kneaders is a kneader provided with a ribbon feeder wherein kneading and feeding of a kneaded product can be performed at the same time in a cylindrical kneading zone equipped with a heat-insulation means. A material to be kneaded is introduced thereinto through one end of the kneading zone, successively moved to the other end while being heated and kneaded, and then is discharged. Along the heat-insulation type kneader between the inlet for the introduction of the material to be kneaded to the outlet through which the kneaded material is discharged, an inlet for introduction of Component (B) and an inlet for introduction of Component (C) are provided in any desired order. An inlet for introduction of the molten mixture of Components (A) and (D) is provided. Thus, a mixture of Components (A), (B), (C) and (D) is obtained, which is then formed in a sheet-like form having a desired thickness. Alternatively, Components (B) and (C) may be kneaded in advance by the use of a suitable kneader and introduced in the form of a molten mixture through the same introduction inlet. The molding of the molten mixture in the sheet-like form can be performed by utilizing, for example, a calender roll. Thereafter, if desired, the thus-obtained sheet-like molding is subjected to usual working, for example, is cut to a desired form or bored by the use of a press or cutter.

In accordance with the foregoing method, a vibration-damping sheet having good vibration-preventing properties over a wide temperature range and having excellent cold-resistance can be produced in high yield even when there is slight variation in the ratio of the straight asphalt to the fibrous filler.

The asphalt compositions of the present invention, comprising Components (A), (B), and (C), and comprising Components (A), (B), (C) and (D) can be widely used as a coating material, an asphalt paint, or the like. In particular, they can be suitably used in production of an asphalt vibration-damping sheet.

EXAMPLES

This invention will be explained in greater detail by reference to the following examples and comparative examples.

EXAMPLES 1 TO 18

To a straight asphalt having a penetration of from 60 to 80 was added a predetermined liquid rubber, and an asbestos having a fiber length of 1 millimeter or less, or a filler having a predetermined grain size, in predetermined amounts, and the resulting mixture was uniformly kneaded to obtain an asphalt composition. The softening point of the thus-obtained asphalt composition is shown in Table 1.

The softening point was measured in accordance with JIS K2531, petroleum asphalt softening point testing method (ring and ball method) (in glycerol bath). The "penetration" value for the asphalt is measured in accordance with JIS K2530 (Penetration Standard).

TABLE 1

| Example No. | Straight Asphalt (parts by weight) | Liquid Rubber (parts by weight) | Filler Type | Grain Size (microns) | Amount (parts by weight) | Softening Point (°C.) |
|---|---|---|---|---|---|---|
| 1 | 100 | 8*1 | wood flour | less than 74*5 | 50 | more than 175 |
| 2 | " | 4.5*1 | " | " | 50 | 165.0 |
| 3 | " | 8*1 | asbestos | less than 1 millimeter*6 | 32 | 153.0 |
| 4 | " | 3.6*1 | " | " | 32 | 127.0 |
| 5 | " | 8*1 | talc | 10.0 | 160 | 165.0 |
| 6 | " | 7.3*1 | " | " | 140 | 110.0 |
| 7 | " | 8*1 | calcium carbonate | 0.04 | 100 | 123.0 |
| 8 | " | 6*1 | " | " | 100 | 110.0 |
| 9 | " | 8*2 | wood flour | less than 74*5 | 50 | 163.0 |
| 10 | " | 4.5*2 | " | " | 50 | 142.0 |
| 11 | " | 8*2 | asbestos | less than 1 millimeter*6 | 32 | 145.0 |
| 12 | " | 3.6*2 | " | " | 32 | 123.0 |
| 13 | " | 8*2 | talc | 10.0 | 160 | 130.0 |
| 14 | " | 7.3*2 | " | " | 140 | 107.0 |
| 15 | " | 8*2 | calcium carbonate | 0.04 | 100 | 117.0 |
| 16 | " | 6*2 | " | " | 100 | 101.0 |
| 17 | " | 8*3 | talc | | 10.0 | 160 | 144.5 |

TABLE 1-continued

| Example No. | Straight Asphalt (parts by weight) | Liquid Rubber (parts by weight) | Filler | | | Softening Point (°C.) |
|---|---|---|---|---|---|---|
| | | | Type | Grain Size (microns) | Amount (parts by weight) | |
| 18 | " | 8*4 | " | " | 160 | 155.5 |

*1Butadiene homopolymer having carboxyl group at the terminal, number average molecular weight: 2,800  Viscosity: 150 poises (30° C.)
*2Butadiene homopolymer having epoxy group in the molecule, number average molecular weight: 2,800  Viscosity: 200 poises (25° C.)
*3Butadiene-acrylonitrile copolymer having amino group at the terminal, number average molecular weight: 3,400  Viscosity: 1,900 poises (30° C.)
*4Butadiene-acrylonitrile copolymer having carboxyl group at the terminal, number average molecular weight: 3,400  Viscosity: 1,200 poises (30° C.)
*5Passing through 200 mesh screen
*6Fiber length

COMPARATIVE EXAMPLES 1 TO 19

The procedure of Example 1 was repeated using a straight asphalt having a degree of penetration of 60 to 80. The results are shown in Table 2.

EXAMPLE 19

The procedure of Example 13 was repeated using a straight asphalt (softening point, 46.0° C.). The thus-obtained asphalt composition had a softening point of 125.0° C.

TABLE 2

| Comparative Example No. | Straight Asphalt (parts by weight) | Liquid Rubber (parts by weight) | Filler | | | Softening Point (°C.) |
|---|---|---|---|---|---|---|
| | | | Type | Grain Size (microns) | Amount (parts by weight) | |
| 1 | 100 | — | — | — | — | 50.0 |
| 2 | " | 8*1 | — | — | — | 44.0 |
| 3 | " | 8*2 | — | — | — | 48.0 |
| 4 | " | 8*3 | — | — | — | 47.0 |
| 5 | " | 8*4 | — | — | — | 47.0 |
| 6 | " | — | wood flour | less than 74*5 | 50 | 117.0 |
| 7 | " | — | asbestos | less than 1 millimeter*6 | 32 | 76.5 |
| 8 | " | — | talc | 10.0 | 160 | 97.5 |
| 9 | " | — | calcium carbonate | 0.04 | 100 | 81.0 |
| 10 | " | 2.5*1 | talc | 10.0 | 160 | 83.0 |
| 11 | " | 2.5*2 | " | " | 160 | 85.0 |
| 12 | " | 8*1 | " | " | 400 | —*9 |
| 13 | " | " | " | " | 400 | —*9 |
| 14 | " | 8*2 | " | " | 400 | —*9 |
| 15 | " | " | " | " | 400 | —*9 |
| 16 | " | 8*7 | — | — | — | 40.0 |
| 17 | " | " | talc | 10.0 | 160 | 63.0 |
| 18 | " | 8*8 | — | — | — | 49.5 |
| 19 | " | " | talc | 10.0 | 160 | 92.0 |

*1-*6the same meaning as described for Table 1.
*7Butadiene homopolymer having hydroxy group at the terminal, number average molecular weight: 2,800  Viscosity: 50 poises (30° C.)
*8Kaliflex TR-1102: Styrene-butadiene-styrene block terpolymer
*9Measurement was impossible because no uniform dispersion could be attained.

Hereinafter, a method of molding a vibration-damping sheet from the asphalt composition of the present invention will be explained.

Vibration-preventing properties, cold impact resistance, surface stickness, heat fluidity and apply suitability were evaluated or tested as follows:

1. Vibration-preventing Properties

Vibration-preventing properties are evaluated by the resonance method (as described in page 438 of Souon Taisaku handbook (Handbook for noise prevention), published by Japan Sound Material Association in 1966).

A vibration-damping sheet 2 millimeters thick is a placed on a steel plate (0.8×20×200 mm), baked at 150±2° C. for 30 minutes, and allowed to cool. Thereafter, sheet portions protruding from the steel plate were cut off with a knife to provide a test specimen. In accordance with the foregoing resonance method, the resonance frequency and half width are measured at 20° C., 40° C., 60° C. and 80° C., and a loss coefficient η at each temperature is calculated.

Greater values of the loss coefficient η indicate higher vibration-preventing properties. When the loss coefficient is less than 0.05, no practical vibration-preventing effect can be obtained (i.e., the practical lower limit is 0.05).

2. Cold Impact Resistance

A vibration-damping sheet (90×150 millimeter) is placed on a coated steel plate (200×150×1 millimeter), bonded thereto by heating 150±2° C. for 30 minutes, and then allowed to cool down to room temperature to provide a test specimen. On two trigonal prism-like supports which are placed in parallel with each other with a distance of 180 millimeters therebetween is mounted the vibration-damping sheet-bonded steel plate in such a manner that the vibration-damping sheet surface faces downward, and it is held in that state at −20±2° C. for 30 minutes. Thereafter, a 50 grams steel ball is dropped on the test specimen at the central portion thereof and the height (centimeter) at which cracking and peeling begin to occur is measured.

Greater values of the height indicate higher cold impact resistance.

3. Surface Stickness

A vibration-damping sheet (about 80 millimeters square) is placed on a coated steel plate (100×100×1 millimeter), bonded thereto by heating at 150±2° C. for 30 minutes, and then allowed to cool down to room temperature to provide a test specimen. On the thus-obtained test specimen are placed two sheets of 70 millimeters square gauze and furthermore a 500 grams weight having a bottom of 40 millimeters in diameter in that sequence. After they are heated at 100° C. for 2 hours and then allowed to cool down to room temperature, the weight is removed and then the gauzes are removed. The state in which the gauze sticks and is stained is examined.

Evaluation of stickness and stain:
  ○ negative
  × positive

4. Heat Fluidity

On a coated steel plate (200×200×1 millimeter) with a bore (60 millimeters in diameter) in the center thereof is mounted a vibration-damping sheet (150×150 millimeter) at the central portion thereof to provide a test specimen. The test specimen is placed horizontally at a location of 15 centimeters from the floor in a forced air ventilation type drier maintained at 150±2° C. After the test specimen is heated at that temperature for 30 minutes. The depth (millimeter) to which the sheet sags through the bore, and the sags or runs are examined.

Evaluation:
  ○ Sagging 10 m/m or less, no runaway
  ○ Sagging 15 m/m or more, no runaway
  × (Runaway), coming off the sagged part
  ※ Sagging 10 m/m or less, (insufficient sagging)

5. Apply Suitability (Suitability of Application)

A vibration-damping sheet is cut to 30 millimeters (width)×300 millimeters (length) to provide a test specimen. The test specimen is placed on a base having a 45° slant at the front thereof and having a smooth surface, and it is pushed toward the slant slowly (at a rate such that the top of the test specimen reaches the slant surface in about 8 seconds). When the top of the test specimen sags and reaches the slant surface, a location at which the other end of the test specimen is positioned is measured with a scale. Thus, the distance (centimeter) for which the test specimen is pushed is determined.

When the distance is too small, the stiffness of the vibration-damping sheet is poor and problems occur in applying it in the summer season. On the other hand, when the distance is too large, the vibration-damping sheet is too hard and similarly, problems occur in applying it in the winter season.

Evaluation:
  × Too soft: 11 centimeters or less
  ○ 11 centimeters to 13 centimeters
  ○ 13 centimeters to 16 centimeters
  ○ 16 centimeters to 18 centimeters
  ※ Too hard: 18 centimeters or more

EXAMPLES 20 TO 26

To 100 parts by weight of a straight asphalt (60 to 80) was added 10 parts by weight of a petroleum resin (Nisseki Neopolymer, softening point: 120° C.), and the resulting mixture was then melted by heating at 170° C. to obtain an asphalt mixture. A liquid rubber (1 part by weight) was heated to 50° and dropwise added to and dispersed in an asbestos 7T-5/filler mixture having the formulation shown in Table 3. The thus-obtained dispersion and the above-obtained asphalt mixture were kneaded in a heating or heat-insulation type knead-extruder (Step A indicated in the footnotes of Table 3) and extruded onto an endless belt rotating at a constant speed. The thus-extruded material was rolled into a sheet of 2 millimeters thick by the use of calender rolls while cooling, e.g., by air circulation or water spraying, to obtain the vibration-damping sheet of the present invention.

The formulation of each example and the results are shown in Table 3.

COMPARATIVE EXAMPLES 20 TO 22

In accordance with the formulation and mixing order indicated in Table 3, a vibration-damping sheet was produced using a straight asphalt (60 to 80). The results are shown in Table 3.

TABLE 3

| | | Example | | | Comparative Example | | | Example | | | |
|---|---|---|---|---|---|---|---|---|---|---|---|
| | | 20 | 21 | 22 | 20 | 21 | 22 | 23 | 24 | 25 | 26 |
| Composition (parts by weight) | | | | | | | | | | | |
| Binder Component | | | | | | | | | | | |
| Asphalt Mixture | Straight Asphalt (60 to 80) | 100 | 100 | 100 | 110 | 110 | 110 | 100 | 100 | 100 | 100 |
| | Petroleum Resin | 10 | 10 | 10 | | | | 10 | 10 | 10 | 10 |
| Modifier | Liquid Rubber A | 1 | 1 | 1 | | | | 1 | 1 | | |
| | B | | | | | | | | | 1 | |
| | C | | | | | | | | | | 1 |
| Filler Component | | | | | | | | | | | |
| Fibrous Filler | Asbestos 7T-5 | 12 | 17 | 22 | 12 | 17 | 22 | | 17 | 17 | 17 |
| | Ground waste paper | | | | | | | 20 | | | |
| Filler | Talc | 210 | 200 | 185 | 210 | 200 | 185 | 200 | | 200 | 200 |
| | Calcium Carbonate | | | | | | | | 200 | | |
| Binder/Fibrous Filler | | 9.3 | 6.5 | 5.0 | 9.3 | 6.5 | 5.0 | 5.5 | 6.5 | 6.5 | 6.5 |
| Production Steps (mixing order) | | (I) | (I) | (I) | (II) | (II) | (II) | (I) | (I) | (I) | (I) |
| Yield (%) | | 95 | 95 | 95 | 14 | 65 | 18 | 94 | 96 | 95 | 97 |
| Performance Vibration-preventing Properties | Temperature 20° C. | 0.13 | 0.14 | 0.14 | 0.08 | 0.07 | 0.08 | 0.12 | 0.14 | 0.14 | 0.13 |
| | 40° C. | 0.12 | 0.14 | 0.15 | 0.07 | 0.06 | 0.06 | 0.10 | 0.12 | 0.12 | 0.11 |
| | 60° C. | 0.09 | 0.10 | 0.11 | 0.04 | 0.04 | 0.04 | 0.08 | 0.10 | 0.09 | 0.08 |
| | 80° C. | 0.06 | 0.08 | 0.09 | 0.01 | 0.01 | 0.02 | 0.05 | 0.07 | 0.06 | 0.06 |
| Cold Impact Resistance (centimeter) | | 65 | 75 | 80 | 30 | 35 | 40 | 60 | 60 | 50 | 60 |
| Surface Stickness | | ○ | ○ | ○ | × | × | × | ○ | ○ | ○ | ○ |
| Heat Fluidity | | ⊙ | ⊙ | ⊙ | × | ○ | ※ | ⊙ | ⊙ | ⊙ | ⊙ |

TABLE 3-continued

|  | Example | | | Comparative Example | | | Example | | | |
| --- | --- | --- | --- | --- | --- | --- | --- | --- | --- | --- |
|  | 20 | 21 | 22 | 20 | 21 | 22 | 23 | 24 | 25 | 26 |
| Apply Suitability | ⊙ | ⊙ | ⊙ | × | × | ✻ | ⊙ | ⊙ | ⊙ | ⊙ |

Note:
Liquid Rubber A: Butadiene homopolymer having carboxyl group at the terminal [1]
Liquid Rubber B: Butadiene homopolymer having epoxy group in the molecule [2]
Liquid Rubber C: Butadiene-acrylonitrile copolymer having carboxyl group at the terminal [3]
Production Step I: A filler in which a liquid rubber is previously dispersed, and an asphalt mixture are mixed.
Production Step II: A filler and an asphalt are mixed.
[1] Butadiene homopolymer having carboxyl group at the terminal, number average molecular weight: 2,800 Viscosity: 150 poises (30° C.)
[2] Butadiene homopolymer having epoxy group in the molecule, number average molecular weight: 2,800 Viscosity: 200 poises (25° C.)
[3] Butadiene-acrylonitrile copolymer having carboxyl group at the terminal, number average molecular weight: 3,400 Viscosity: 1,200 poises (30° C.)

In the vibration-damping sheet produced from the asphalt composition of the present invention, the vibration-preventing properties are markedly increased over a wide temperature range by the composite action of the resinous tackifier and the liquid rubber even though the amount of the liquid rubber added is significantly small, and furthermore it has improved cold impact resistance and surface stickness characteristics. Additionally, in the vibration-damping sheet of the present invention, the heat fluidity is not lowered even if the ratio of binder to fibrous filler is changed, and thus a large volume of sheets can be produced while maintaining high quality, whereas in the conventional product wherein no liquid rubber is added, the heat fluidity is abruptly lowered by a change in the ratio of binder to fibrous filler, and as a result, the quality of product is poor and the yield is lowered greatly. Furthermore, the vibration-damping sheet is excellent in the so-called stiffness, and even if its surface area is large, it can be easily mounted on a plate member. Thus, it is excellent workability.

What is claimed is:

1. An asphalt composition comprising
   (A) 100 parts by weight of asphalt;
   (B) 0.1 to 20 parts by weight of a diene liquid rubber having at least one carboxyl group, epoxy group or amino group in the molecule; and
   (C) 2 to 350 parts by weight of (i) an asbestos fibrous filler having a fiber length of 1 mm or less.

2. The composition of claim 1, wherein said asphalt is a straight asphalt.

3. The composition of claim 2, wherein the diene liquid rubber is a butadiene homopolymer having a carboxyl group in the molecule.

4. The composition of claim 2, wherein the diene liquid rubber is a butadiene homopolymer having an epoxy group in the molecule.

5. The composition as claimed in claim 2, wherein the straight asphalt has a penetration of 40 to 100.

6. The composition of claim 1 or 2 or 3 or 4, wherein the diene liquid rubber has a number average molecular weight of 500 to 8,000 and a viscosity of 2,000 poises or less at 30° C.

7. An asphalt composition comprising:
   (A) 100 parts by weight of asphalt;
   (B) 0.1 to 20 parts by weight of a diene liquid rubber having at least one carboxyl group, epoxy group or amino group in the molecule;
   (C) 2 to 350 parts by weight of (i) a fibrous filler or (ii) at least one filler in particulate form selected from the group consisting of wood flour, talc, calcium carbonate, clay, carbon black and white carbon, having a particle size of 200 microns or less; and
   (D) 1 to 50 parts by weight of a resinous tackifier.

8. The composition of claim 7, wherein the asphalt is a straight asphalt.

9. The composition of claim 8, wherein the diene liquid rubber is a butadiene homopolymer having a carboxyl group in the molecule.

10. The composition of claim 8, wherein the diene liquid rubber is a butadiene homopolymer having an epoxy group in the molecule.

11. The composition of claim 8, wherein the straight asphalt has a penetration of 40 to 100.

12. The composition of claim 8, wherein the diene liquid rubber has a number average molecular weight of 500 to 8,000 and a viscosity of 2,000 poises or less at 30° C.

13. The composition of claim 8, wherein the filler is asbestos.

14. The composition of any one of claims 8, 9, 10, 11, 12 or 13, wherein the resinous tackifier is a petroleum resin having a softening point of from 70° to 150° C.

15. A vibration-damping sheet formed from asphalt composition comprising:
   (A) 100 parts by weight of a straight asphalt;
   (B) 0.1 to 20 parts by weight of a diene liquid rubber having a carboxyl group, an epoxy group or an amino group in the molecule; and
   (C) 2 to 350 parts by weight of (i) an asbestos fibrous filler having a fiber length of 1 mm or less.

16. The composition of claim 7 wherein said filler is a fibrous filler and said fibrous filler is asbestos having a fiber length of 1 mm or less.

17. An asphalt composition comprising
   (A) 100 parts by weight of asphalt;
   (B) 0.1 to 20 parts by weight of a diene liquid rubber which is a butadiene homopolymer having an epoxy group in the molecule; and
   (C) 2 to 350 parts by weight of (i) a fibrous filler; or (ii) at least one filler in particulate form selected from the group consisting of wood flour, talc, calcium carbonate, clay, carbon black, and white carbon, having a particle size of 200 microns or less.

* * * * *